United States Patent [19]

Kasai

[11] Patent Number: 4,629,260
[45] Date of Patent: Dec. 16, 1986

[54] PIGGYBACK ROLLING-CONTACT BEARING ASSEMBLY

[75] Inventor: Naomi Kasai, Tokyo, Japan

[73] Assignee: Nippon Thompson Co., Ltd., Tokyo, Japan

[21] Appl. No.: 731,684

[22] Filed: May 7, 1985

[51] Int. Cl.⁴ .............................................. F16C 29/04
[52] U.S. Cl. ...................................................... 384/49
[58] Field of Search ........................... 308/6 R, 3.8, 6 C

[56] References Cited
U.S. PATENT DOCUMENTS
4,549,773 10/1985 Papp et al. ............................ 308/3.8

Primary Examiner—Lenard A. Footland
Attorney, Agent, or Firm—Alan H. MacPherson; Steven F. Caserza; Richard Franklin

[57] ABSTRACT

A rolling-contact bearing assembly includes an inner guide member having a U-shaped cross section, an outer guide member having a U-shaped cross section and arranged to substantially enclose the inner guide member as oriented in the same direction in a piggyback fashion, and rolling members interposed between the inner and outer guide members to allow a relative motion therebetween. Such a piggyback arrangement is advantageous in enhancing the structural integrity of the assembly and making the assembly smaller in size.

7 Claims, 7 Drawing Figures

PIGGYBACK ROLLING-CONTACT BEARING ASSEMBLY

BACKGROUND OF THE INVENTION

1. Field of the Invention

This invention generally relates to a rolling-contact assembly, and, in particular, to a piggyback rolling-contact bearing assembly including an inner guide member having a U-shaped cross section and an outer guide member having a U-shaped cross section and provided as piggybacked to the inner guide member.

2. Description of the Prior Art

The rolling-contact bearing assembly is well known in the art and it is generally comprised of rolling elements interposed between an outer and inner guide member. When such a rolling-contact bearing assembly is used to support a rotating shaft, the inner and outer guide members are defined in the form of a ring. On the other hand, when such a rolling-contact bearing assembly is used for linear motion, the inner and outer guide members are defined in the form of a straight channel.

A typical example of such a linear motion rolling-contact bearing assembly is illustrated in FIGS. 4a–4c. As shown, the assembly includes a bed 1 which has a U-shaped cross section and corresponds to the inner guide member and a table 2 which has also a U-shaped cross section and corresponds to the outer guide member. In this assembly, the U-shaped bed 1 is provided right-side up with its open side located at its top, but the U-shaped table 2 is provided upside down with its open side located at its bottom, and, since the table 2 is larger in size than the bed 1, the table 2 effectively embraces the bed 1 from the front. The bed 1 is U-shaped and thus it has a flat bottom section and a pair of side wall sections each extending upright from the corresponding side of the bottom section. A straight, V-shaped guide groove 1a is formed along the outer surface of each of the side wall sections. Similarly, a corresponding straight, V-shaped guide groove 2a is formed along the inner surface of each of the side wall sections of the table 2. A plurality of balls 3 are provided as fitted between the opposed guide grooves 1a and 2a as equally spaced apart from each other by means of a ball retainer 4. With this structure, a straight, relative motion between the bed 1 and the table 2 may be produced as the balls 3 roll along the guide grooves 1a and 2a.

In the structure shown in FIGS. 4a–4c, there is also provided a table end plate 5 fixedly attached at each end of the table 2 by means of screws and a bed end plate 6 fixedly attached at each end of the bed 1 also by means of screws. A stopper 7 is fixedly attached to the inner surface of the flat, bottom section of the table 2 approximately at the center thereof, and, thus, the stroke of relative motion between the table 2 and the bed 1 is limited by the engagement between the stopper 7 and the bed end plate 6.

As described above, the rolling-contact bearing assembly typically includes the U-shaped inner and outer guide members 1 and 2, which are arranged such that the outer guide member 2 embraces the inner guide member 1 from the front whereby the inner surfaces of the flat, bottom sections of the inner and outer guide members 1 and 2 face opposed to each other. Such a structure is not advantageous from the viewpoint of space saving because a substantially large dead space is necessarily formed between the inner and outer guide members 1 and 2. Because of the presence of such a dead space, the assembly itself is relatively large in size, which limits the scope of application of such a bearing assembly. Moreover, it has been found difficult to make height H smaller in such a structure, which also presents another limitation to the scope of the application.

SUMMARY OF THE INVENTION

In accordance with the present invention, there is provided a rolling-contact bearing assembly including an inner guide member having a generally U-shaped cross section and an outer guide member which has also a generally U-shaped cross section and which is provided to embrace the inner guide member from behind such that the inner surface of the flat, bottom section of the outer guide member faces the outer surface of the flat, bottom section of the inner guide member. Thus, in the present rolling-contact bearing assembly, the outer guide member appears to be piggybacked to the inner guide member when viewed in the transverse cross section. Such a piggyback arrangement is advantageous in many respects, in particular in eliminating dead space as much as possible, which could contribute to make the assembly extremely smaller in size, in particular its height.

It is therefore a primary object of the present invention to obviate the disadvantages of the prior art as described above and to provide an improved rolling-contact bearing assembly.

Another object of the present invention is to provide a rolling-contact bearing assembly which is compact in size, in particular smaller in height between the outer and inner guide members.

A further object of the present invention is to provide a rolling-contact bearing assembly which allows a wider scope of application.

Other objects, advantages and novel features of the present invention will become apparent from the following detailed description of the invention when considered in conjunction with the accompanying drawings.

BRIEF DESCRIPTION OF THE DRAWINGS

FIG. 1b is a perspective view showing the rolling-contact bearing assembly of FIG. 1a;

DESCRIPTION OF THE PREFERRED EMBODIMENTS

Figure 1A:
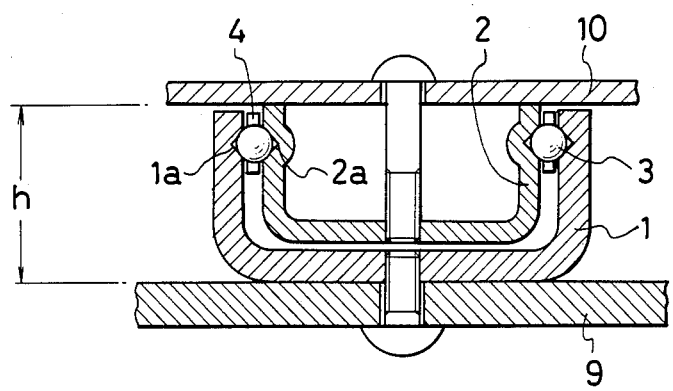
FIG. 1a is a transverse, cross-sectional view showing a piggyback rolling-contact bearing assembly constructed in accordance with one embodiment of the present invention.
Figure 1B:
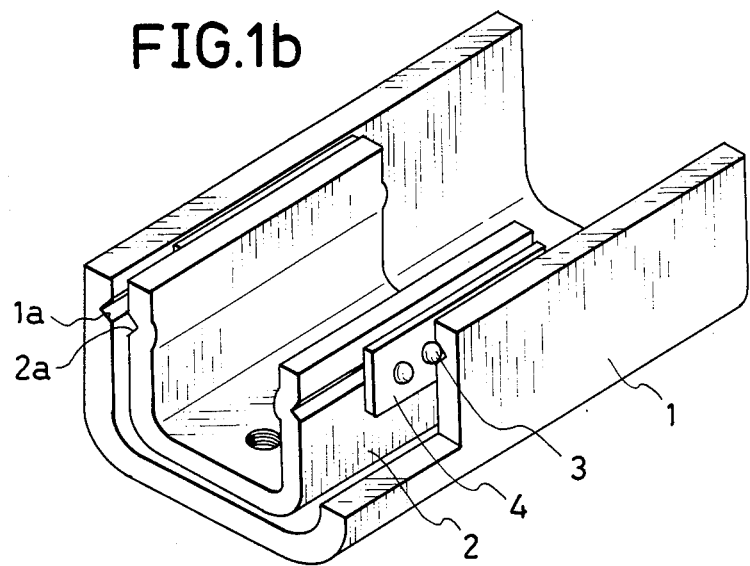

Referring now to FIGS. 1a and 1b, there is shown a linear motion rolling-contact bearing assembly of the piggyback type constructed in accordance with one embodiment of the present invention. It is to be noted that the illustrated bearing assembly is for finite linear motion, i.e., the scope of relative motion between inner and outer guide members is limited by the movement of rolling members interposed between the inner and outer guide members. It is to be noted, however, that the present invention should not be limited only to such a finite linear motion rolling-contact bearing assembly, but it is equally applicable to the infinite linear motion type wherein the scope of relative motion between the inner and outer guide members is not limited by the movement of the rolling members.

As shown in FIGS. 1a and 1b, the bearing assembly includes the bed 1 which has a U-shaped cross section and which defines the outer guide member of the assembly. In the illustrated embodiment, the bed 1 is arranged right-side up with its open side located at the top. The present assembly also includes the table 2 which also has a U-shaped cross section and which defines the inner guide member of the assembly. Of importance, in the illustrated embodiment, the table 2 is also arranged right-side up with its open side located at the top. Thus, the bed 1 and the table 2 are arranged in the same orientation such that the bed 1, defining the outer guide member, embraces the table 2, defining the inner guide member, from behind in a piggyback fashion.

Since the bed 1 and table 2 each have a U-shaped transverse cross section, they have a flat, bottom section and a pair of side wall sections each extending upright from the corresponding side of the flat, bottom section. Thus, in the arrangement shown in FIG. 1a the outer surface of the flat, bottom section of the table 2 faces the inner surface of the flat, bottom section of the bed 1. The straight guide groove 1a is formed on the inner surface of each of the side wall sections of the bed 1, and, similarly, the corresponding straight guide groove 2a is formed on the outer surface of each of the side wall sections of the table 2. These guide grooves 1a and 2a are preferably V-shaped and they are provided opposite to each other to define a guide passage for guiding the movement of the balls 3.

A plurality of balls 3 are provided as interposed between the corresponding pair of guide grooves 1a and 2a and as equally spaced apart from each other by means of the ball retainer 4. Thus, the table 2 may move relative to the bed 1 as the balls 3 rotate along the guide grooves 1a and 2a. The bed 1 is fixedly attached to a first frame 9 by means of bolts and the table 2 is also fixedly attached to a second frame 10 by means of bolts. The embodiment shown in FIG. 1a is the case in which the second frame 10 is a flat support plate larger in width than the table 2. Thus, after insertion through a hole provided in the support plate 10, a bolt is threaded into the corresponding threaded hole provided in the flat, bottom section of the table 2 for tightening. It is to be noted, however, that the manner of fixing the table 2 to the support plate 10 is not limited only to the use of bolts, but any other fixing methods can also be applied.

As is obvious from the structure shown in FIG. 1a, the dead space between the bed 1 and the table 2 in the present bearing assembly is minimized. Moreover, the inner space defined by the table 2 is easily accessible because it is an open space before being fixed to the support plate 10, and, thus, there is more freedom in mounting the present bearing assembly to a desired location. In addition, height h defined between the bed 1 and the table 2 can be made as small as possible in the present structure so that the present bearing assembly can be provided even if the distance between the frames 9 and 10 is relatively small.

Figure 2:
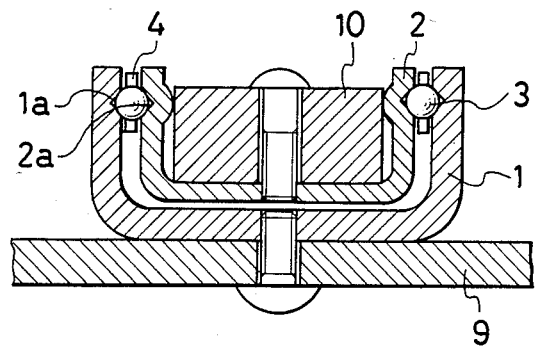
FIGS. 2 and 3 are transverse, cross-sectional views showing two alternative embodiments of the present invention.

FIG. 2 shows the case in which the second frame 10 is narrower in width and has a width substantially equal to the inner width of the table 2. In this case, the second frame 10 may be provided as substantially enclosed in the table 2 as shown and this is particularly advantageous in saving space. Moreover, since the table 2 may be brought into intimate contact with the second frame 10, the structural integrity is enhanced.

Figure 3:
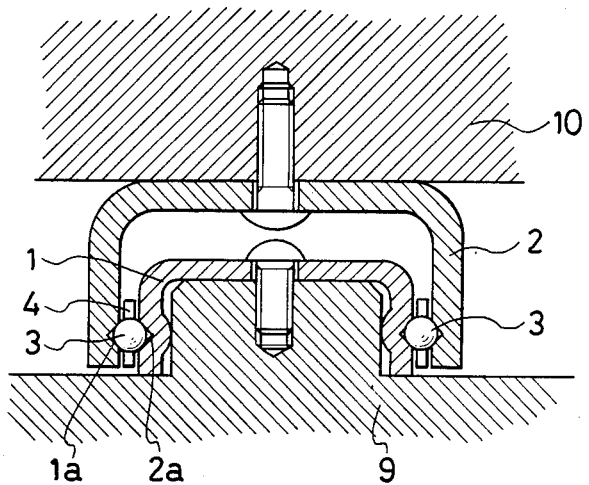
Figure 4A:
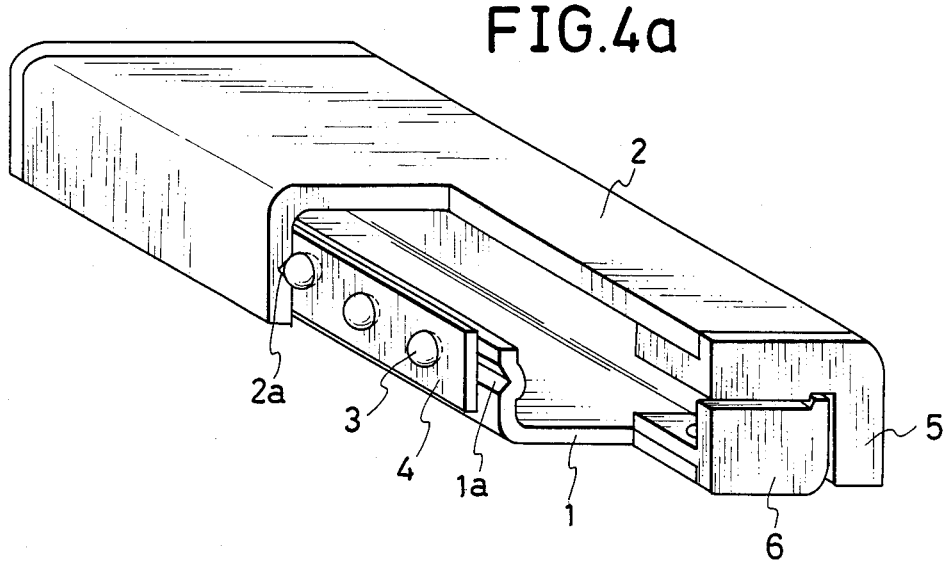
FIGS. 4a–4c are schematic illustrations showing a typical linear motion rolling-contact bearing assembly.
Figure 4B:
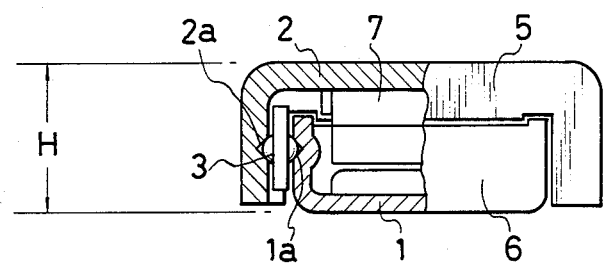
Figure 4C:
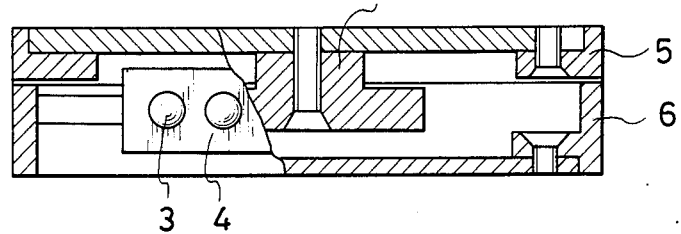

FIG. 3 shows the case in which the relative arrangement between the bed 1 and the table 2 is reversed so that, in the present arrangement, the bed 1 defines an inner guide member and the table 2 defines an outer guide member which houses therein the inner guide member in a piggyback fashion. In this case, the first frame 9 is provided with a ridge-like projection on which the bed 1 is fixedly attached as straddled. On the other hand, the table 2 is fixedly attached to the first frame 10 by means of bolts. Thus, there may be produced a relative motion between the first and second frames 9 and 10 via the present rolling-contact bearing assembly. It is to be noted that the structural integrity between the bed 1 and the first frame 9 is significantly enhanced because the bed 1 straddles the projection. Because of such a structure having an enhanced integrity, either one or both of the bed 1 and table 2 may be made relatively thin in thickness.

While the above provides a full and complete disclosure of the preferred embodiments of the present invention, various modifications, alternate constructions and equivalents may be employed without departing from the spirit and scope of the invention. For example, the above-described embodiments are cases where the present invention has been applied to the rolling-contact bearing assembly for finite linear motion. It is to be noted, however, that the present invention is also applicable to those rolling-contact bearing assemblies for infinite linear motion, in which the relative motion between the inner and outer guide members is, in principle, not limited because it is structured so that the balls move along a predetermined circular path. Moreover, in the above-described embodiments, use has been made of balls as rolling members; however, other types of rolling members, such as columnar rollers, may also be used, if desired. In addition, the case has been described in which the present invention has been applied to the bearing assembly for linear motion; however, it is to be noted that the present invention may also be applied to the bearing assembly for rotational motion. In this case, the inner and outer guide members should be defined in the form of a ring. Therefore, the above description and illustration should not be construed as limiting the scope of the invention, which is defined by the appended claims.

What is claimed is:

1. A rolling-contact bearing assembly comprising:
   first guide means having a generally U-shaped cross section having a flat bottom wall and a pair of side walls extending from both sides of said flat bottom wall;
   second guide means having a generally U-shaped cross section, having a flat bottom wall and a pair of side walls extending from both sides of said flat bottom wall, and arranged to substantially enclose said first guide means as oriented in the same direction;
   rolling means interposed between siad first and second guide means for allowing a relative motion between said first and second guide means; and
   fixing means for fixing said first and second guide means to first and second desired objects, respectively, whereby said fixing means is provided at the flat bottom wall of each of said first and second guide means.

2. The assembly of claim 1 wherein said first guide means includes at least one first guide groove and said second guide means includes at least one second guide groove facing to said first groove thereby defining a guide passage, whereby said rolling means is positioned to move along said guide passage.

3. The assembly of claim 2 wherein said rolling means includes a plurality of balls.

4. The assembly of claim 3 further comprising retaining means for retaining said plurality of balls as spaced apart from each other over a predetermined interval.

5. The assembly of claim 1 wherein said fixing means includes at least one first threaded hole provided in the flat bottom wall of said first guide means and at least one second threaded hole provided in the flat bottom wall of said second guide means.

6. The assembly of claim 5 wherein said first object includes a ridge-like projection and said first guide means is fixedly attached to said first object as straddling said projection.

7. The assembly of claim 1 wherein said first guide means includes an elongated first guide member having a first length in the longitudinal direction of said assembly and said second guide means includes an elongated second guide member having a second length in said longitudinal direction.

* * * * *